United States Patent

Newton et al.

[11] Patent Number: 6,029,389
[45] Date of Patent: Feb. 29, 2000

[54] FISHING ROD HANDLE

[76] Inventors: John Reginald Newton, Brackenthwaite House, Blackwood, Storis Park, Bowness-on-Windermere, Cumbria, LA23 GLS, United Kingdom; David Stocker, 1 Dallas Road., Lancaster, Lancashire, LA1 2TN, United Kingdom

[21] Appl. No.: 08/374,772

[22] PCT Filed: Aug. 6, 1993

[86] PCT No.: PCT/GB93/01675

§ 371 Date: Apr. 19, 1995

§ 102(e) Date: Apr. 19, 1995

[87] PCT Pub. No.: WO94/03052

PCT Pub. Date: Feb. 17, 1994

[30] Foreign Application Priority Data

Aug. 8, 1992 [GB] United Kingdom ................... 9216862

[51] Int. Cl.⁷ .................................................. A01K 87/00
[52] U.S. Cl. ................................................ 43/23; 43/21.2
[58] Field of Search ................................. 43/21.2, 22, 23, 43/18.1, 18.5

[56] References Cited

U.S. PATENT DOCUMENTS

| D. 108,721 | 3/1938 | Morgan .................................... 43/23 X |
| 3,197,908 | 8/1965 | Hirsch ......................................... 43/22 |
| 4,631,853 | 12/1986 | Brackett et al. ............................. 43/23 |
| 4,850,130 | 7/1989 | Chilre et al. ................................. 43/23 |
| 4,905,400 | 3/1990 | Brackett et al. ............................. 43/23 |
| 5,396,727 | 3/1995 | Furuya et al. ............................... 43/23 |
| 5,509,228 | 4/1996 | Wright, Jr. .................................. 43/23 |

*Primary Examiner*—David A. Scherbel
*Assistant Examiner*—Anthony Ojini
*Attorney, Agent, or Firm*—Bacon & Thomas, PLLC

[57] ABSTRACT

A fishing rod handle is gripped in the palm of a hand with the third, fourth and fifth phalange being wrapped around an outwardly diverging part of a handle and with the second phalange being located alongside those phalanges. The thumb extends along the handle such that the rod can be cast.

15 Claims, 4 Drawing Sheets

FISHING ROD HANDLE

FIELD OF THE INVENTION

The present invention relates to a handle for a fishing rod.

SUMMARY OF THE INVENTION

According to one aspect of the present invention a handle for a fishing rod includes a gripping portion, the gripping portion being arranged, in use, to be at least partially surrounded by the third, fourth and fifth phalanges of a hand and a palm of that hand characterised in that the dimensions of at least part of the handle increase in a first direction extending from the region associated with the grip provided, in use, by the fifth phalange and palm towards the region associated with the grip provided, in use, by the third phalange and palm.

The handle may be arranged to be used to hold a rod extending from a forward part of the handle with the third phalange being arranged to be more towards the forward part of the handle than the fifth phalange with a part at least of the gripping portion being inclined relative to the longitudinal axis of the elongate member.

According to a second aspect of the present invention a handle for a fishing rod includes a gripping portion, the handle, in use, being arranged to be used to hold an elongate member extending from a forward part of the handle, the gripping portion, in use, being arranged to be at least partially surrounded by the third, fourth and fifth phalanges of a hand and the palm of that hand with the third phalange being arranged to be more towards the forward part of the handle than the fifth phalange, the handle being characterised in that a part at least of the gripping portion is arranged to be inclined relative to the longitudinal axis of the fishing rod.

The dimensions of at least part of the gripping portion may increase in a direction extending away from the forward part of the handle.

The dimensions of the gripping portion extending between the regions arranged to be bounded by the first and third knuckles of the third, fourth and fifth phalanges may increase in the first direction. Alternatively or additionally the gripping portion may be curved or concave in the region bounded by the first and third knuckles of the third, fourth and fifth phalanges and the severity of the curve may decrease in the first direction. Alternatively or additionally, the dimensions of the gripping portion extending between the regions arranged to be bounded by the third knuckles of the third, fourth and fifth phalanges and the palm of the hand may increase in the first direction. Alternatively or additionally the dimensions of the gripping portion may increase in the extent arranged to be between the second knuckles of the third, fourth and fifth phalanges and the palm of the hand in the first direction.

The gripping portion may include an outwardly extending portion in the region of one or both ends of the gripping portion. The or each outwardly diverging or extending portion may be arranged to be contacted by a phalange to resist relative movement of the handle to a hand gripping the handle in one or both directions through the grip.

The gripping portion may also be arranged to be at least partially surrounded by a second phalange. Alternatively or additionally the handle may include a second phalange portion adjacent to the gripping portion with the second phalange and the palm of a hand being arranged to at least partially surround the second phalange portion.

The dimensions of at least part of the second phalange portion may be less than the corresponding dimension of the gripping portion in the region arranged to be at least partially surrounded by the third phalange and the palm. These dimensions which may be less may correspond with the variation in the dimensions of the gripping portion previously referred to.

The handle may also include a raised portion included between the first phalange region and the gripping region. That raised portion may be arranged to be engaged, in use, by the second and third phalange to resist relative movement of the handle through a hand.

The handle may include a first phalange portion or, alternatively or additionally a second phalange portion arranged, in use, to be engaged by the first or second phalange and that portion may be recessed slightly to receive the first or second phalange. The first or second phalange portion may extend along the length of the handle and in a line extending along the handle in the direction of extent of the first or second phalange portion and the extent of that line may be in a different general direction with respect to the elongate axis of a rod, when the handle can be used to hold a rod, along the first or second phalange portion than it is along the gripping portion. The first or second phalange portion may be arranged to converge towards the axis of a fishing rod, when the handle is mounted on a rod, in a direction away from the gripping portion.

When the handle is arranged, in use, to hold a rod, the part of the gripping portion arranged to be engaged by the palm of a hand may diverge from a line parallel to the axis of the elongate member that passes through the gripping portion in the direction along the gripping portion towards the forwards portion.

When the handle is arranged, in use, to hold a rod, the part of the gripping portion arranged to be engaged by the third, fourth and fifth phalanges may converge towards a line parallel to the axis of the elongate member that passes through the gripping portion in the direction along the gripping portion towards the forwards portion.

The cross-sectional dimension of at least part of the gripping portion and possibly substantially the whole of the gripping portion in a first direction may be less than the cross-sectional dimension in a transverse direction. Said dimension in the first direction may be arranged to be, in use, the region between the third knuckle of the third, fourth and fifth phalanges and the palm.

The present invention also includes a fishing rod incorporating a handle as herein referred to.

According to a third aspect of the present invention a method of holding a fishing rod comprises engaging a handle of the rod with the palm of a hand and the third, fourth and fifth phalanges such that at least a part of the grip diverges from the fifth to the third phalange.

According to a fourth aspect of the present invention, there is provided a handle for a fishing rod, the handle having a forward end and a rearward end, said forward end being closer to the tip of the rod in use, the handle further including:

a first gripping portion arranged to be contacted by the third, fourth and fifth phalanges of a hand, said first gripping portion curving outwardly on moving towards said rearward end; and a second gripping portion arranged to be contacted by the palm of the hand;

the arrangement of said handle being such that, in use, the first and second gripping portions may be gripped between the third, fourth and/or fifth phalanges and the palm of the hand.

Said first gripping portion is preferably arranged to be contacted only by said third, fourth and fifth phalanges and by no other part of the hand.

Said first gripping portion is preferably concave. Said first gripping portion preferably diverges away from an elongate axis of the handle on moving towards the rearward end of the handle.

Said first gripping portion is preferably smoothly curved.

Said first gripping portion preferably faces generally downwardly.

Said second gripping portion preferably faces generally upwardly. Thus, it will be appreciated that said first and second gripping portions preferably face in substantially opposite directions.

Said second gripping portion is preferably arranged to be contacted by the thenar of the palm of the hand. The handle is preferably arranged such that, in use, a gripping force exerted on said handle by the third phalange is substantially balanced by a gripping force exerted on said handle, in an opposite direction, by said thenar. The handle is preferably arranged so that said gripping forces are directed in a direction which is substantially perpendicular to an elongate axis of the handle.

Said second gripping portion is preferably convex in a first region thereof. Said second gripping portion may be concave in a second region thereof, said second region being closer to the rearward end of the handle than said first region. Said second region suitably defines a position of location for a base of the hand. The handle is suitably arranged such that, in use, a gripping force exerted on said handle by the fifth phalange is substantially balanced by a gripping force exerted on said handle, in an opposite direction, by the base of the hand.

Side portions of said handle preferably extend between said first and second gripping portions. Preferably, a first side portion and/or a second side portion is/are curved. Said first and/or said second portion(s) are preferably convex.

Said handle preferably includes a third gripping portion arranged to be contacted by a second phalange of the hand. Said third gripping portion is preferably nearer the forward end of the handle than the first gripping portion. Said third gripping portion preferably faces generally downwardly. Said third gripping portion is preferably adjacent said first gripping portion and is suitably arranged so that, in use, said second phalange may be positioned closely adjacent the third phalange. Preferably, in use, said second phalange may abut the third phalange.

Said handle preferably further includes a fourth gripping portion arranged to be contacted by a first phalange of the hand. Said fourth gripping portion is preferably nearer the forward end of the handle than the second gripping portion. Said fourth gripping portion preferably faces generally upwardly. Said fourth gripping portion is preferably curved. Said fourth gripping portion is preferably concave. Said fourth gripping portion preferably diverges away from an elongate axis of the handle on moving towards the rearward end of the handle. Said fourth gripping portion is preferably adjacent said second gripping portion.

Said handle is preferably symmetrical about a first mirror plane. Said first mirror plane preferably extends along said elongate axis of the handle. Said first mirror plane preferably bisects said first and second gripping portions. Such a symmetrical handle is suitable for both right-handed and left-handed use.

The cross-sectional shape or said handle preferably varies along its length.

According to a fifth aspect of the present invention, there is provided a method of holding a fishing rod comprising engaging a handle as herein referred to.

According to a sixth aspect of the present invention, there is provided a method of casting a fishing rod when holding the rod by a method as herein referred to by moving the rod from a rearwards to a forwards position.

It is the aim of the invention to provide a handle designed to function as an interface between the hand and the item of equipment, in such a way as to retain the correct alignment of the joints, muscles and tendons in the hand and forearm.

According to another aspect of the present invention there is provided a handle for use with a piece of equipment, the handle comprising a generally elongate member extending from a first end which is, in use, adjacent the item of equipment towards a free end, the handle including between said two ends a grip portion profiled to receiver a user's hand in a natural, undistorted grip position such that the user may achieve increased energy transfer to the equipment whilst maintaining control over the equipment.

Preferably, the handle is generally ellipsoidal in cross-section, at least over a substantial portion of its length, and the cross-sectional dimensions of that ellipsoidal portion increase gradually from a point close to the free end towards a point close to the first end. In use, when the hand closes in a grip position around the handle, the third, fourth and fifth phalanges would be accommodated in this portion of increasing cross-sectional dimensions.

Preferably, the handle includes, in an upper surface of the handle, adjacent said first end, a recessed portion which, in use receives the thumb (first phalange). In this specification, phalange is used to mean finger, including the thumb.

In use, it has been found that such a profiled grip portion in a handle enables a user to achieve a good, firm grip on the handle whilst retaining the hand in a natural grip position.

A particularly advantageous feature of the profiled grip portion is that a strong grip is achieved primarily by means of the third, fourth and fifth phalanges closing around the portion of increasing cross-sectional dimensions. The first and second phalanges also contribute to the firmness of the grip, but it is not essential that these two phalanges are always in contact with the handle, and indeed a firm grip is maintained even if either or both of the first and second phalanges are lifted away from the handle. This is important for certain applications of the handle, for example if the handle is to be used on a fishing rod where the thumb is always in contact with the rod handle, but has the primary function of controlling the direction of the rod. The second phalange is used to grip the fishing line, and for this reason it is important that the second phalange can be lifted away from the handle to perform this function without loss of grip.

The handle may be manufactured as a separate item, to be subsequently attached to the item of equipment, or it may alternatively be integrally formed with the item of equipment.

The following description illustrates use of the handle on a fishing rod, but it should be appreciated that the handle may be used on any item of equipment, particularly sports equipment, where the handle has to perform that dual role of gripping the handle accurately controlling the item of equipment.

This invention relates to a handle for use on fishing rods. It has been designed to function as the interface between the hand and the rod and accommodates different rod/reel combinations, casting styles and retrieve methods. In providing for these different functions the design aims to retain correct alignment and balance of forces within the joints, muscles and tendons in the hand and forearm thus achieving economy of effort and minimum fatigue. The handle has been designed so that it may be used with equal effect, by both the left and right hand and accommodates a range of hand sizes.

The present invention includes any combination of the herein referred to features or limitations.

BRIEF DESCRIPTION OF THE DRAWINGS

The present invention may be carried into practice in various ways but several embodiments will now be described, by way of example, and with reference to the accompanying drawings, in which.

DETAILED DESCRIPTION OF PREFERRED EMBODIMENTS OF THE INVENTION

The development of the fishing rod has taken place around advances in the material from which the rod was constructed, with emphasis being placed on matching the taper of the rod to the material of construction. In this way a vast variety of rod actions can be obtained to match a particular fishing need. The most demanding rod action is that required by a fly rod where only the line itself is used to make the cast. Fly rods demand the optimum from rod materials and taper designs in addition to casting skill from the angler. Throughout the development of rods the makers have continually sought materials of greater potential and this progress has seen the use of greenheart, cane, steel, fibre glass and today carbon fibre is the dominant material.

Although new materials continue to be developed and these will influence the performance of rods, in recent years a point has been reached where modern materials can provide properties which are beyond the users ability to take full advantage of them. If further advances are to be made then it is necessary to consider the other elements which contribute to performance of a rod. An obvious area for development is the rod handle, which represents the interface between the angler and the rod. Rod handle design has virtually remained static throughout the history of rod building. The introduction of cork as a hand material, which occurred prior to 1900, being the last innovation of significance. As for shape, rod handles remain a simple round tube in cross-section for fly rods and those used with fixed spool reels.

The action of casting a fly rod demands that the caster transfer energy from the arm into the rod whilst simultaneously guiding the rod to ensure the cast is directed and controlled as intended. The hand must therefore perform a complex task combining an energy transfer function with one of precision control. The hand is a complex structure of bones, muscles and tendons and if during transfer of energy into the fly rod the structure of the hand is distorted by poor design of the interface with the rod handle then significant losses will occur. There will be a loss of energy and a loss of control, both of which are detrimental to the process of casting.

Analysis of current rod handle design reveals that considerable distortion of the hand occurs when gripping the rod and the tip of the first phalange (thumb) has to transfer a considerable amount of force into the rod on the forward cast. Distortion of the hand structure creates abnormal tension in tendons, muscles and joints. It is this out-of-balance condition which manifests itself in a number of ways. The angler will have to expend more energy to transfer the desired amount of energy into the rod and there will be a loss of control and hence accuracy. Compensating for the imbalance will increase the fatigue of muscles, tendons and joints which, in its extreme case, will cause injury and the condition known as tennis elbow—increasingly common among fly fishermen.

Although the action of casting imposes the greatest loads into the hand, particularly in the case of fly rods, line retrieval must also be accommodated as during this process the rod must be held whilst the line is retrieved. Retrieval styles vary and the most commonly used techniques involve the line being drawn across the second phalange or between the tip of the first and second phalange. Any handle design must allow for continued grip of the rod whilst allowing these phalanges to perform the retrieval function. Conventional handle design whilst allowing the line retrieval functions to be performed provides a poor grip.

The handle of a rod is the interface between the angler and his rod and in addition to the functions of casting and line retrieval the angler feels the bite of a fish through the handle. The inner face of the hand is particularly sensitive and provided the contact pressure between the hand and the handle remains low, the hand will retain a very high degree of sensitivity and this is a significant advantage to the angler. Hence if the hand can grip the rod with only the slightest of pressure the anglers ability to detect bites is enhanced.

Figure 1:
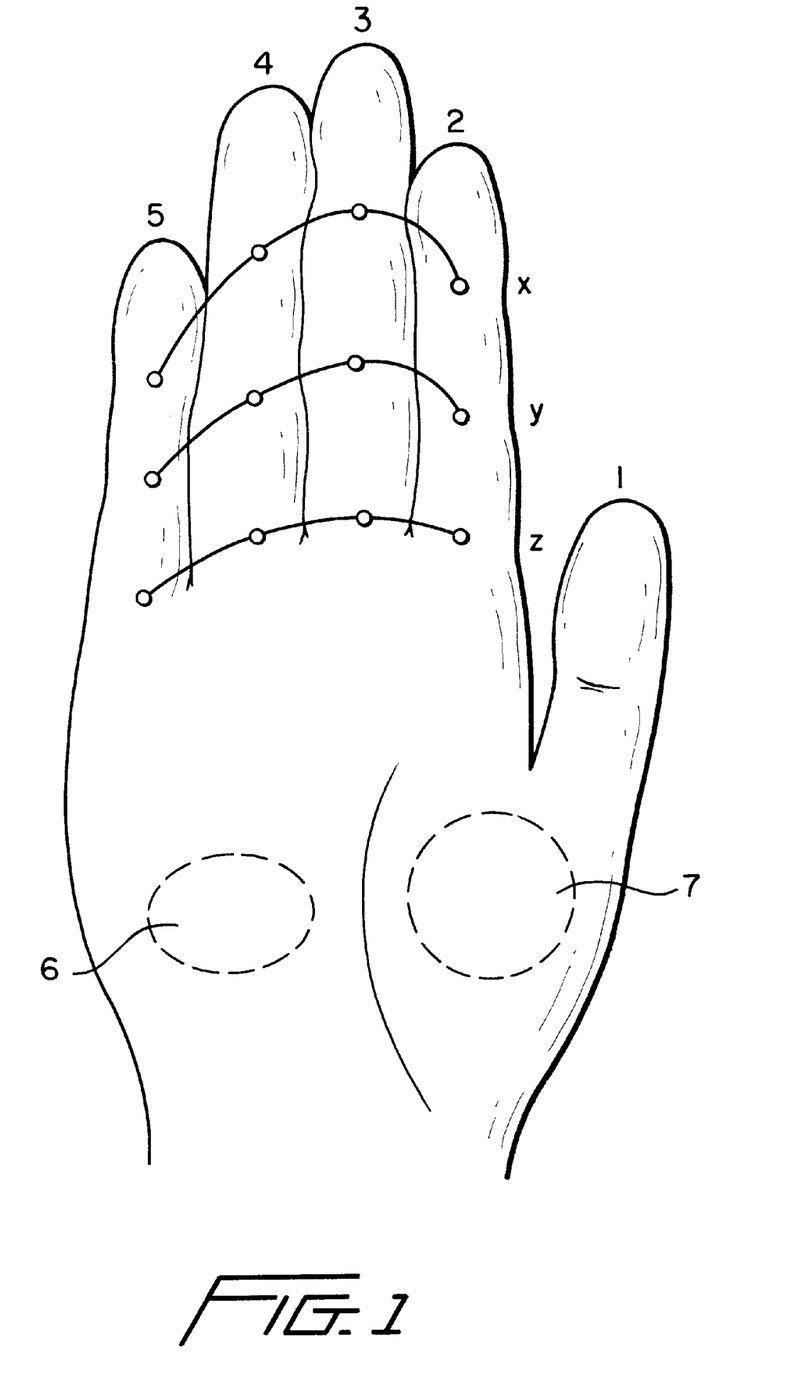
FIG. 1 illustrates schematically the relationship between the joint lengths of the second, third, fourth and fifth phalanges of the human hand.

The hand "when held in a neutral grip position" forms a complex internal shape. A study of the hand reference FIG. 1, reveals the reason for this complex shape. Lines X, Y and Z which pass through the corresponding first, second and third joint of each phalange, show lengths increasing from phalanges 5 to 3 and the decreasing to phalange 2. This characteristic pattern of joint lengths suggests that the internal shape should be two cones placed with their bases back to back at the junction of phalanges 2 and 3. However, when phalange 1 is considered, its effect is to want to bend over the cone above phalange 2. The internal shape created approximates to that of a banana and it is logical to progress to the pistol grip which is so commonly used for articles like guns.

Unfortunately the pistol grip is not suitable for fishing rods because the angle at which the rod leaves the handle would demand unnatural movement of the arm and wrist during the motion of casting, hence this type of handle is not found on fishing rods. Indeed the pistol grip is specifically designed to hold an article still and there is no intent to transfer energy to the tip of the pistol by moving a hand such as is required when casting. However, what is important is that a handle design takes into consideration the natural internal shapes which occur due to the construction of the hand.

The present handle design seeks to provide a handle suitable for fishing rods that can accommodate the functions of casting, line retrieval and bite detection whilst maintaining balance of the joints, muscles and tendons in the hand and arm achieving economy of effort with minimum fatigue.

The handle of this invention is described as follows commencing with the normal casting grip.

Figure 2A:
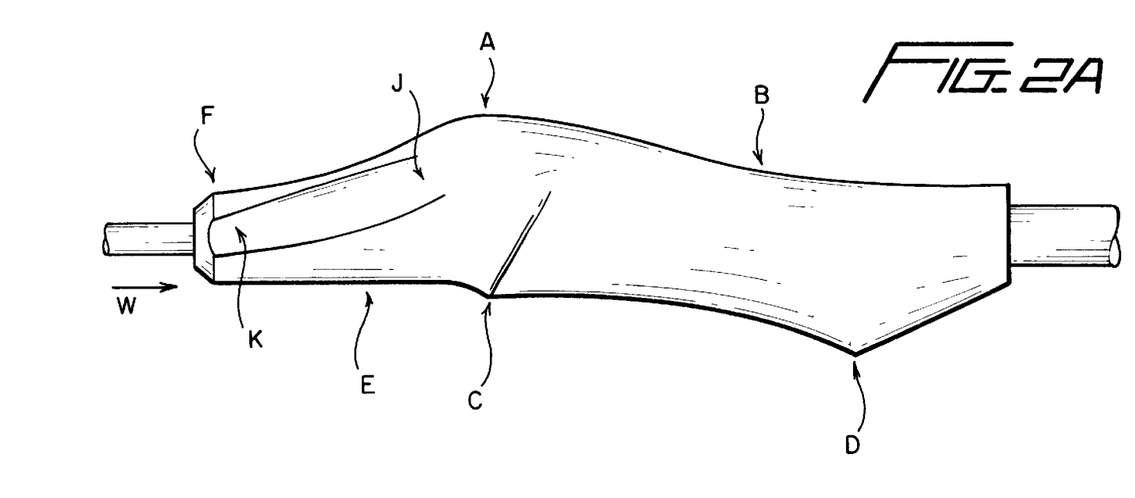
FIG. 2A is a side view of a first embodiment of a handle according to the invention.
Figure 2B:
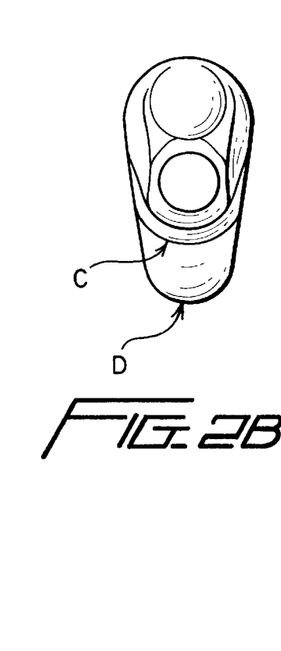
FIG. 2B is a view in the direction of arrow W in FIG. 2.
Figure 2C:
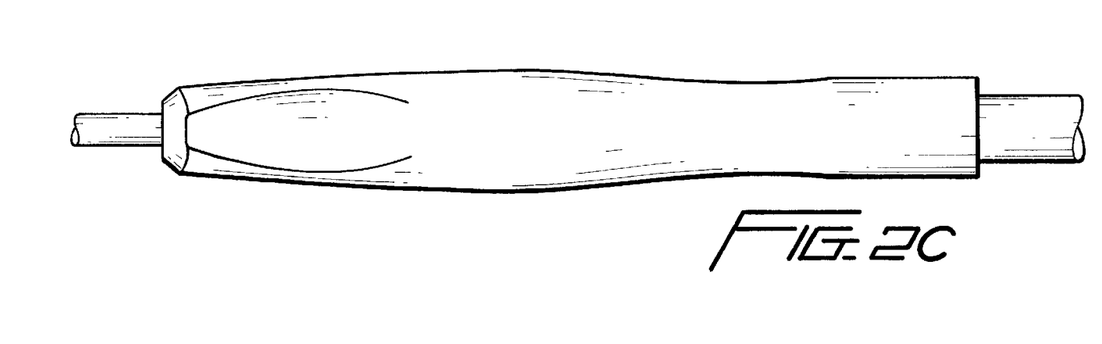
FIG. 2C is a plan view of the handle shown in FIG. 2A.
Figure 3:
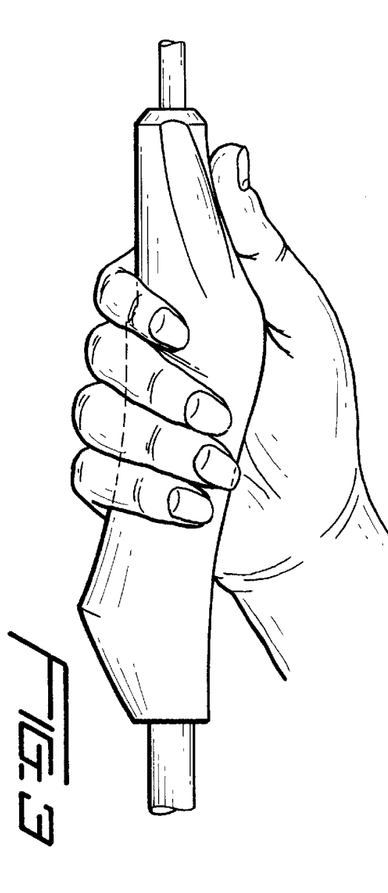
FIG. 3 is a side view illustrating how the hand grips the handle in a first configuration.

Referring to FIG. 2, the primary grip, which involves phalanges 3, 4 and 5, the base of the hand 6 and thenar 7 is provided by the handle from points 'A' to 'B' and 'C' to 'D' as shown in FIG. 3, which shows the hand in the traditional casting position. In cross-section this lower surface is arcuate and its radius is largest at point 'C' and progressively reduces to point 'D'. Typical sizes would be a radius of 13 mm at point 'C' and 10 mm at point 'D'.

This change of radius accommodates the change in joint length of phalanges 3, 4 and 5 previously described. Viewed from the side, the handle from point 'C' to 'D' is curved, typical value is a radius of 195 mm. The effect of this curve during the action of casting, i.e. when the handle is being tightly gripped, is to provide a force component which has the effect of forcing the three phalanges together. At the value of radius given this force is just sufficient to prevent the phalanges from separating and significantly helps to prevent slippage of the handle. The length of the curve 'C' to 'D' is sufficient to accommodate phalanges 2, 3, 4 and 5 and the distance 'C' to 'D' is typically 88 mm. Although the curve 'C' to 'D' normally accommodates phalanges 3, 4 and 5 it is made longer to accommodate a second method of gripping the handle described later.

The thenar 7 (the prominence on the palm of the hand at the base of the thumb), locates on the handle on the upper curved surface at the point 'A'. In cross-section the top surface is rounded, and may have a radius 14 mm and in side view a blend of three radii which provide a comfortable platform for the thenar. The base of the hand, i.e. the prominence adjacent to phalanges 5, is accommodated at point 'B'. In cross-section the top surface is round, typical radius 11.5 mm and in side view is a radius, typical value 200 mm, and this provides a comfortable surface for the base of the hand through which force can be applied. In cross-section the radii of the top surface, 'A' to 'B' and lower surface 'C' to 'D' are blended together with a radius, typical value 200 mm. From the side view, it can also be seen that the lower surface diverges away from the longitudinal axis from C to D and the upper surface converges towards that axis from A to B.

The grip so far described provides the primary grip. It can be gripped equally effectively with either left or right hand and the lengths 'C' to 'D' and 'A' to 'B' are more than adequate to accommodate a range of hand sizes. In cross-section it has been found very important that the top surface 'A' to 'B' and lower surface 'C' to 'D', both of which are radii, are joined with a blend radius which creates a convex side face to the handle. The typical values of radii provided have been found to be very comfortable in the hand of the average male. Positioning of the phalanges 3, 4 and 5 in relation to the thenar and base of the hand is such that these components of the hand are maintained in a position of balance, thus sharing the forces imposed by casting and fishing with a rod. By achieving this balance of forces the handle can be firmly gripped during the motion of casting without slippage occurring. When performing the task of line retrieval the handle merely rests within the hand and almost no grip is required. This enhances the sensitivity of the angler to bites and keeps fatigue to a minimum.

The second phalange is accommodated along a lower surface of the forward end of the primary grip between points 'C' and 'E'. In cross-section, this lower surface is round, typical radius 11 mm and this radius is blended at the sides of the handle towards point 'A' providing a location for the second phalange. The blending also has the effect of providing an edge against which the second phalange can get purchase which helps prevent slippage of the handle during casting it will be observed that the point 'C' on the handle is a raised portion that forms a cusp at the intersection of gripping portions 'E-C' and 'C-D'. In the forward direction from 'C' to 'E' the handle lower surface slopes inwardly toward the handle centerline and then extends essentially parallel with the longitudinal centerline. In the rearward direction from 'C' to 'D' the lower surface curves away from the centerline along a progressively increasing slope (at a greater angle to the centerline at the rear portion that at the forward portion).

On conventional handles the second phalange is very important in providing grip during casting. In the case of the handle of this invention casting can be achieved without necessarily employing this phalange, and its use during casting serves to enhance the grip allowing greater distribution of forces associated with casting and hence less fatigue on the primary grip elements of the hand. During line retrieval or casting using a rod with a fixed spool reel, the second phalange can be used to perform its other functions without loss of primary grip.

The extreme two joints of the first phalange are accommodated in the curved section between points 'A' to 'F' which section is also recessed slightly. In this position the first phalange can be used to control direction of the rod and assist in preventing slippage of the handle during casting. It is not required to transfer the high forces associated with normal rod handles, and the first phalange is used in a more neutral position which causes less fatigue.

With the hand in the position described the grip arrangement is ideal for the majority of casting variations encountered when fishing a fly rod or rod equipped with a fixed spool reel In the case of a fly rod, grip can be maintained whilst the second phalange is used for the function of line retrieval. Furthermore the first phalange can be slipped off the surface 'A' to 'F' and the tip brought into contact with the tip of the second phalange and the line retrieved between them. In this grip configuration, the primary grip is still maintained with very little loss of control of the rod and this is a positive advantage to the angler.

The grip described is ideal for most casting requirements when the rod is cast with the tip being above the anglers head height. In situations where the angler must cast under overhanging trees, some schools of angling, prefer to point the second phalange along the axis of the rod. The handle of this invention has been designed to accommodate this alternative grip method and is described as follows.

Figure 4:
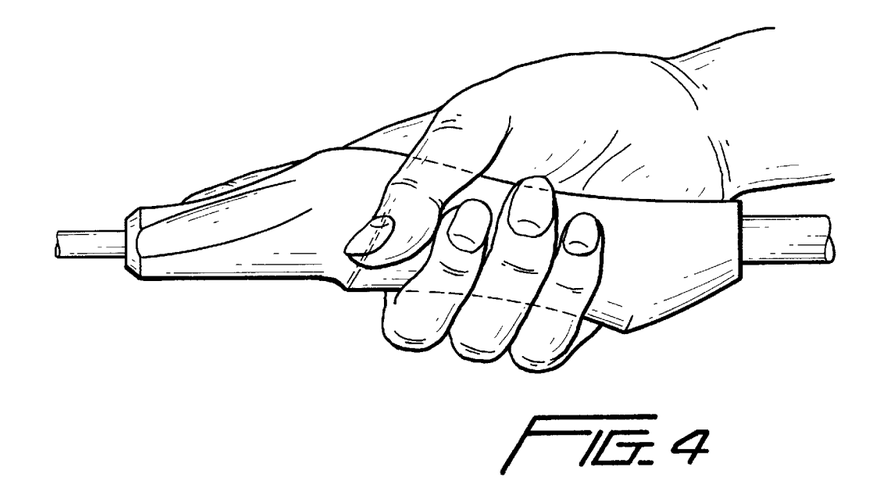
FIG. 4 is a side view similar to FIG. 3 illustrating a hand grip in a second configuration.
Figure 5:
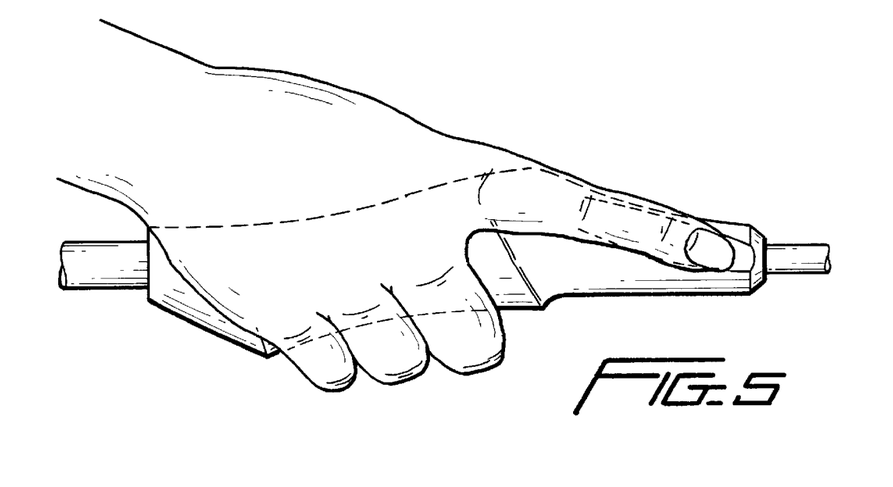
FIG. 5 is a view similar to FIG. 4 from the other side.

The handle is provided with a slightly recessed pad between points 'J' and 'K' which accommodates the second phalange. As the second phalange is moved into this position the hand moves towards the rear (reel) end of the handle with phalanges 3, 4 and 5 still occupying the curved position 'C' to 'D'. The first phalange is brought round to lay next to the third phalange. The new grip position is shown on FIG. 4 and 5. The extra length provided from point 'C' to 'D', previously referred to, allows the hand to move towards the rear of the handle whilst still retaining primary grip.

Figure 6:
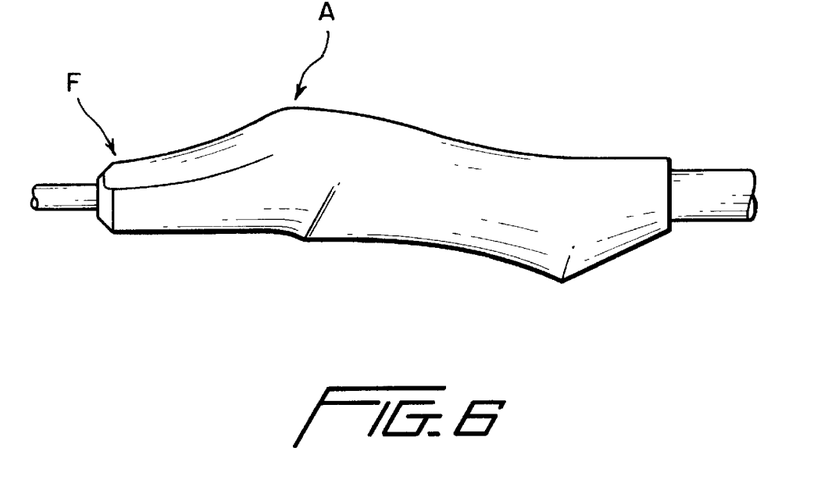
FIG. 6 is a side view of a modified handle.

One further grip type used in fly fishing may be accommodated by modification of the grip. When casting from a platform, such as a boat, with no obstructions behind or in front of the angler a cast can be made which travels close to the water and requires that the thumb instead of being along the axis of the rod in position 'A' to 'F' is brought around to lay along the edge of the line 'A' to 'F'. In this particular case a platform is provided on the edge of 'A' to 'F' as shown in FIG. 6.

Figure 7:
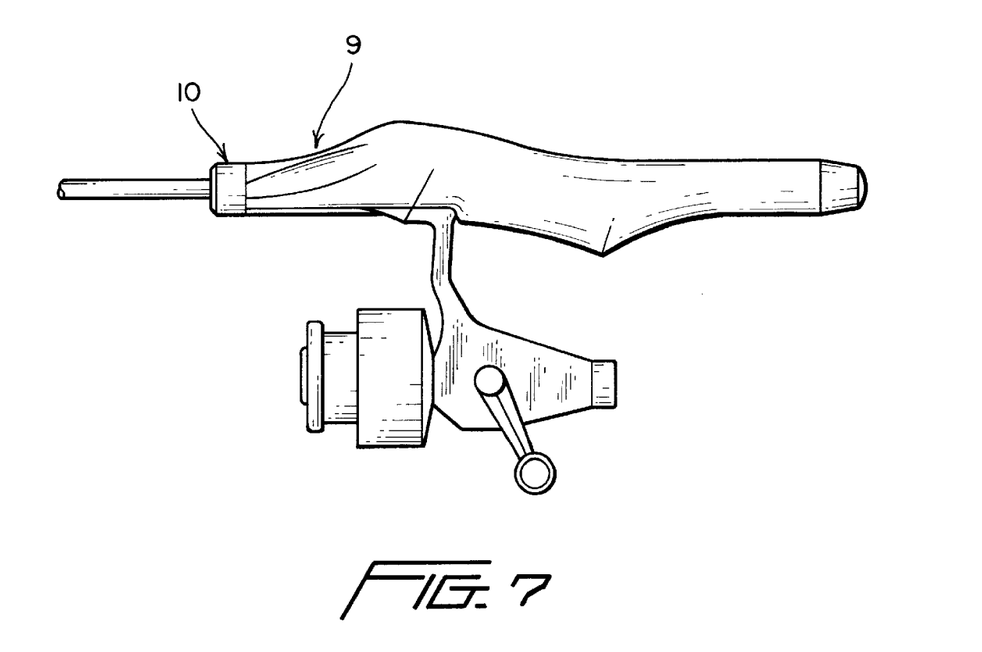
FIG. 7 is a side view of a further modification of a handle shown in association with a spool reel.

The description thus far has concentrated on the fly rod, however, the handle is ideal for use on rods equipped with fixed spool reels. The stem of the reel 8 is located between phalanges 3 and 4 and the grip allows excellent freedom for phalange 2 to control release of line during casting. A typical design is shown in FIG. 7. The handle shown is largely the same as that previously described with the addition of an extension 9 and a locking device 10 to hold the reel in place.

The handles can be manufactured as a separate item, to be subsequently attached to an item of equipment or, alternatively, a handle may be formed integrally with the equipment.

For fishing rods the preferred material of construction of the handle is high grade cork, which retains its properties when wet. Alternative materials such as rubber and plastics can be used.

We claim:

1. A handle for a fishing rod, the handle including a gripping portion, the gripping portion, in use, being arranged to be at least partially surrounded by the third, fourth and fifth phalanges of a hand on the lower side of the gripping portion with a palm of that hand extending over the upper side, the third phalange being arranged to be more towards a forward part of the handle than the fifth phalange, the gripping portion being narrower in cross-section from one side to the other than it is from the upper to the lower side, wherein, in relation to the centre line passing from the rearward to the forward part of the gripping portion, the upper side of the gripping portion, in the rearward to the forward direction extends upwardly relative to the centre line and at a lesser angle to the centre line at a rearward portion than it does at a forward portion and in that, in the rearward to forwards direction, the lower side of the gripping portion extends upwardly relative to the centre line and at a greater angle to the centre line at a rearward portion than it does at a forward portion; said gripping portion including an outwardly extending cusp portion at its forward end arranged to be engaged on its forward side by the second phalange, said cusp portion being sloped towards the handle centerline in the direction of the centerline on the forward side thereof.

2. A handle as claimed in claim 1 in which the distance between the upper and lower side of the gripping portion at an extent perpendicular to the centre line is greater at the region where it is arranged to be at least partially surrounded by the third phalange than it is at the region where it is arranged to be at least partially surrounded by the fifth phalange.

3. A handle as claimed in claim 1 in which the gripping portion extending between the regions arranged to be bounded by the first and third knuckles of the third, fourth and fifth phalanges includes dimensions that increase in the rearward to the forward direction.

4. A handle as claimed in claim 1 in which the gripping portion is curved along the centre line in the region bounded by the first and third knuckles of the third, fourth and fifth phalanges.

5. A handle as claimed in claim 4 in which the curve is concave.

6. A handle as claimed in claim 1 including an index finger portion comprising a recessed portion extending to the forward part of the handle, away from the gripping portion on the side of the handle.

7. A handle as claimed in claim 1 in which a raised portion is included between a thumb region and the gripping portion.

8. A handle as claimed in claim 1 including a first thumb portion arranged, in use, to be engaged by the thumb of a hand.

9. A handle as claimed in claim 8 in which the first thumb portion extends along the length of the handle.

10. A handle as claimed in claim 9 in which the first thumb portion converges towards the centre line in the forwards direction.

11. A handle according to claim 1 the handle being symmetrical about a mirror plane which extends along the centre line of the handle and bisects the upper and lower sides of the gripping portion.

12. A handle as claimed in claim 1, in which the handle includes a first index finger portion adjacent the gripping portion in which the second phalange and the palm of the hand are arranged so as to surround, and a second index finger portion comprising a longitudinal recessed portion extending to the forward portion of the handle, away from the gripping portion, on the side of the handle.

13. A handle as claimed in claim 1, including a raised portion at the intersection of the rearward and forward portions of the gripping portion; a first thumb portion extending along the forward portion; said first thumb portion converging toward the centre line in the forward direction.

14. A handle for a fishing rod, the handle including a gripping portion, the gripping portion, in use, being arranged to be at least partially surrounded by the third, fourth and fifth phalanges of a hand on the lower side of the gripping portion with a palm of that hand extending over the upper side, the third phalange being arranged to be more towards a forward part of the handle than the fifth phalange, the gripping portion being narrower in cross-section from one side to the other than it is from the upper to the lower side, wherein, in relation to the centre line passing from the rearward to the forward part of the gripping portion, the upper side of the gripping portion, in the rearward to the forward direction extends upwardly relative to the centre line and at a lesser angle to the centre line at a reward portion than it does at a forward portion and in that, in the rearward to forwards direction, the lower side of the gripping portion extends upwardly relative to the centre line and at a greater angle to the centre line at a rearward portion than it does at a forward portion; and wherein the distance between the upper and lower side of the gripping portion at an extent perpendicular to the centre line is greater at the region where it is arranged to be at least partially surrounded by the third phalange that it is at the region where it is arranged to be at least partially surrounded by the fifth phalange; said gripping portion including an outwardly extending cusp portion at its forward end arranged to be engaged on its forward side by the second phalange, said cusp portion being sloped towards and extending along the handle centerline on the forward side thereof.

15. A handle for a fishing rod, the handle including a gripping portion, the gripping portion, in use, being arranged to be at least partially surrounded by the third, fourth and fifth phalanges of a hand on the lower side of the gripping portion with a palm of that hand extending over the upper side, the third phalange being arranged to be more towards a forward part of the handle than the fifth phalange, the gripping portion being narrower in cross-section from one side to the other than it is from the upper to the lower side, wherein, in relation to the centre line passing from the rearward to the forward part of the gripping portion, the upper side of the gripping portion, in the rearward to the forward direction extends at a lesser angle to the centre line at a rearward portion than it does at a forward portion and in that, in the rearward to forwards direction, the lower side of the gripping portion extends at a greater angle to the centre line at a rearward portion than it does at a forward portion; and wherein the gripping portion extending between the regions arranged to be bounded by the first and third knuckles of the third, fourth and fifth phalanges includes dimensions that increase in the rearward to the forward direction.

* * * * *